United States Patent
Naseef

(10) Patent No.: US 10,644,787 B2
(45) Date of Patent: May 5, 2020

(54) METHOD AND TESTING SYSTEM FOR TESTING A COMMUNICATION BETWEEN A MOBILE DEVICE AND A SATELLITE SYSTEM

(71) Applicant: Rohde & Schwarz GmbH & Co. KG, Munich (DE)

(72) Inventor: Mahmud Naseef, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 239 days.

(21) Appl. No.: 15/421,153

(22) Filed: Jan. 31, 2017

(65) Prior Publication Data

US 2018/0219612 A1   Aug. 2, 2018

(51) Int. Cl.
*H04B 7/185* (2006.01)
*H04B 17/27* (2015.01)
*H04B 17/318* (2015.01)

(52) U.S. Cl.
CPC ......... *H04B 7/18513* (2013.01); *H04B 17/27* (2015.01); *H04B 17/318* (2015.01)

(58) Field of Classification Search
CPC .. H01Q 1/34; H04B 17/0085; H04B 7/18513; H04B 17/318; H04B 17/27
See application file for complete search history.

(56) References Cited

U.S. PATENT DOCUMENTS

| | | | |
|---|---|---|---|
| 2013/0271317 A1* | 10/2013 | Goel | G01S 19/23 342/357.62 |
| 2014/0225767 A1* | 8/2014 | Cordone | H04B 7/18508 342/352 |
| 2017/0242129 A1* | 8/2017 | Kallankari | G01R 29/0821 |

\* cited by examiner

*Primary Examiner* — Yuwen Pan
*Assistant Examiner* — Fatuma G Sherif
(74) *Attorney, Agent, or Firm* — Schwabe, Williamson & Wyatt, P.C.

(57) ABSTRACT

A method for testing a communication between a mobile device and a satellite system is described, wherein testing signals are generated by using a signal generation unit, said testing signals simulating satellite signals of at least one satellite of said satellite system. Further, said testing signals are received by a device under test being used as said mobile device. Said testing signals simulate at least one of a changing satellite signal strength, a changing satellite signal quality, a changing position of said satellite and more than one satellite signal in parallel. Further, said testing signals simulate a changing position of said mobile device. In addition, a testing system for testing a communication between a mobile device and a satellite system is described.

16 Claims, 2 Drawing Sheets

METHOD AND TESTING SYSTEM FOR TESTING A COMMUNICATION BETWEEN A MOBILE DEVICE AND A SATELLITE SYSTEM

The invention relates to a method for testing a communication between a mobile device and a satellite system and a testing system for testing a communication between a mobile device and a satellite system.

BACKGROUND

Testing systems for testing a communication between a mobile device, for instance a ship, and a single satellite are known in the state of the art. Typically, such a testing system comprises a signal generation unit that generates a testing signal that is forwarded to a device under test that corresponds to the mobile device. During the testing, the device under test communicates with signal generation unit such that a communication between the mobile device and the satellite system is simulated, in particular a satellite of that satellite system. The simulated communication may be a bidirectional one.

Usually, a satellite system comprises more than one satellite wherein the mobile device may communicate with a first and a second satellite depending on its position with regard to the footprints of the different satellites. The footprints of satellites are also called spotbeams. During an established communication, the mobile device may move such that the mobile device leaves the footprint of a first satellite of the satellite system. Then, the mobile device has to establish a communication with another satellite of the satellite system whose footprint is adjacent to the one of the first satellite or even intersect in parts. This is generally called handover scenario.

Until now, the handover scenario has been tested in live scenario. However, this is very expensive and it might be worth to test the handover scenario at an early stage of a development. Accordingly, up to now it is not possible to test such a handover scenario in a cost-efficient manner.

Accordingly, there is a need for an inexpensive possibility to test a moving mobile device during an established communication which is inter alia required for testing a handover scenario of a mobile device between two satellites of a satellite system.

SUMMARY OF THE INVENTION

The invention provides a method for testing a communication between a mobile device and a satellite system, with the following steps:
a) Generating testing signals by using a signal generation unit, said testing signals simulating satellite signals of at least one satellite of said satellite system;
b) Receiving said testing signals by a device under test being used as said mobile device;
said testing signals simulating at least one of a changing satellite signal strength, a changing satellite signal quality, a changing position of said satellite and more than one satellite signal in parallel;
said testing signals further simulating a changing position of said mobile device.

Further, the invention provides a testing system for testing a communication between a mobile device and a satellite system, said testing system comprising a signal generation unit, said signal generation unit being configured to generate testing signals simulating satellite signals of at least one satellite of said satellite system. The testing system also comprises a device under test configured to receive said testing signals. Said testing signals simulate at least one of a changing satellite signal strength, a changing satellite signal quality, a changing position of said satellite and more than one satellite signal in parallel. Said testing signals simulate a changing position of said device under test.

The invention is based on the finding that a movement of the mobile device can be tested by generating the testing signals corresponding to the satellite signals appropriately. For instance, the testing signals are varied in order to simulate the movement. Accordingly, the signal generation unit takes a supposed movement of the mobile device into account while generating the testing signals that simulate the satellite signals such that the simulated movement of the mobile device results from changing testing signals. Besides the simulation of the movement of the mobile device, the testing signals may also correspond to the satellite signals of two different satellites such that a handover scenario of the mobile device between these two satellites of the satellite system can be tested. For instance, a first testing signal is varied during the testing for simulating the movement of the mobile device with respect to a first satellite wherein at least a second testing signal is generated in order to simulate the communication between the mobile device and a second satellite of the satellite system, in particular the beginning of the communication between the mobile device and the second satellite.

According to an aspect, said device under test maintains its position during testing. The device under test corresponding to the mobile device in the testing system is not moved even though a movement of the mobile device is simulated. In other words, the device under test is substantially fixed during the testing with regard to a lateral movement. Thus, the supposed (lateral) movement of the mobile device is only simulated by adapting the testing signals appropriately. However, a movement on a position may be performed during the testing, for instance swaying and/or turning.

According to another aspect, said device under test comprises a beamforming unit, in particular wherein at least two different beams are generated by said beamforming unit. The beamforming unit may be a beamforming antenna system. For instance, said beamforming unit comprises at least one transmission antenna and at least one receiving antenna. Generally, the beamforming unit is configured to set the receiving and/or transmission characteristics of the device under test in order to adapt the communication between the device under test and the signal generation unit corresponding to the mobile device and the satellite, respectively. Thus, the phase and/or relative amplitude can be controlled. The beamforming unit may comprise a phased array.

The device under test representing the mobile device as well as the signal generation unit representing the satellite system may have at least one transmission and at least one receiving antenna. Thus, a bidirectional communication between the mobile device and the satellite system can be simulated and tested.

Said testing signals may simulate a beamsteering of said satellite signals. Alternatively or supplementary, beamsteering is performed on said device under test, in particular by using said beamforming unit. Accordingly, the phases of the signals emitted by the device under test and/or the testing signals are amended, for instance for simulating beamsteering of the satellite signals. Particularly, no mechanical movement is necessary as the footprint of the satellite is varied electrically using beam steering.

According to a certain embodiment, said testing signals simulate at least two different footprints of said satellite system. As already mentioned, a footprint of a satellite corresponds to its spotbeam which means the area covered by the satellite. Thus, two different areas covered are simulated by the testing signals in order to simulate the handover scenario of the mobile device between two different satellites of the satellite system.

Particularly, said testing signals received by the device under test are analyzed by using an analyzing unit. The testing system may comprise an analyzing unit that is connected to at least one of said device under test and said signal generation unit. For instance, the analyzing unit is a spectrum analyzer or any other suitable testing or measurement instrument. The analyzing unit may be configured to analyze the processing of the testing signals in the device under test. Thus, the analyzing unit can verify if the supposed movement of the mobile device has been simulated appropriately. For instance, the analyzing unit and the signal generation unit are integrated in a common device.

According to another aspect, a satellite handover scenario within said satellite system is simulated, said satellite handover scenario being seamless. The seamless handover scenario comprises a pretracking function of the mobile device. Thus, the mobile device uses at least two different beams for maintaining connection with one satellite and for tracking other satellites, respectively. Once the connection between the mobile device and the other satellite becomes better than the already existing one, the handover scenario is started in a seamless manner. This seamless handover scenario is simulated appropriately as the signal generation unit generates testing signals that simulate the corresponding movement of the mobile device as well as the seamless handover scenario between the at least two satellites. Particularly, the location of the different satellites are known such that it can be predicted when and/or where to switch to the other satellite, in particular the testing signal simulating the footprint of the other satellite.

Moreover, an executed handover of said device under test between two different satellite signals may be indicated by using an indication unit. The indication unit is configured to indicate the executed handover of said device under test between two different satellite signals. Thus, the different satellite signals being simulated correspond to two satellite signals that are emitted by two different satellites. The indication unit may be part of the analyzing unit. For instance, the indication unit can comprise a display for illustrative purposes such that an executed handover being simulated is displayed for the user of the testing system.

Particularly, said testing signals comprise data concerning at least one of global navigation satellite system and carrier identification. Global navigation satellite system (GNSS) data are used in satellite navigation systems for locating a position and navigation purposes. Carrier identification (CID) data are used for identifying a certain mobile device and/or a certain satellite (system). Accordingly, the positioning and navigating of a certain mobile device can be simulated appropriately.

Furthermore, said device under test may be mounted on top of a metal support, said metal support being configured to simulate a ship movement. As the mobile device may be a ship, the metal support simulates the environment of the communication system used in reality with regard to reflectance, for instance. Moreover, the typical movement of the ship like swaying can be simulated during the testing. During swaying, the device under test maintains its (lateral) position as it only sways on the same position. The lateral movement being relevant for the tested handover scenario is simulated by generating and varying the testing signals appropriately.

BRIEF DESCRIPTION OF THE DRAWINGS

The invention will now be described with reference to the accompanying drawings. In the drawings.

DETAILED DESCRIPTION

Figure 1:
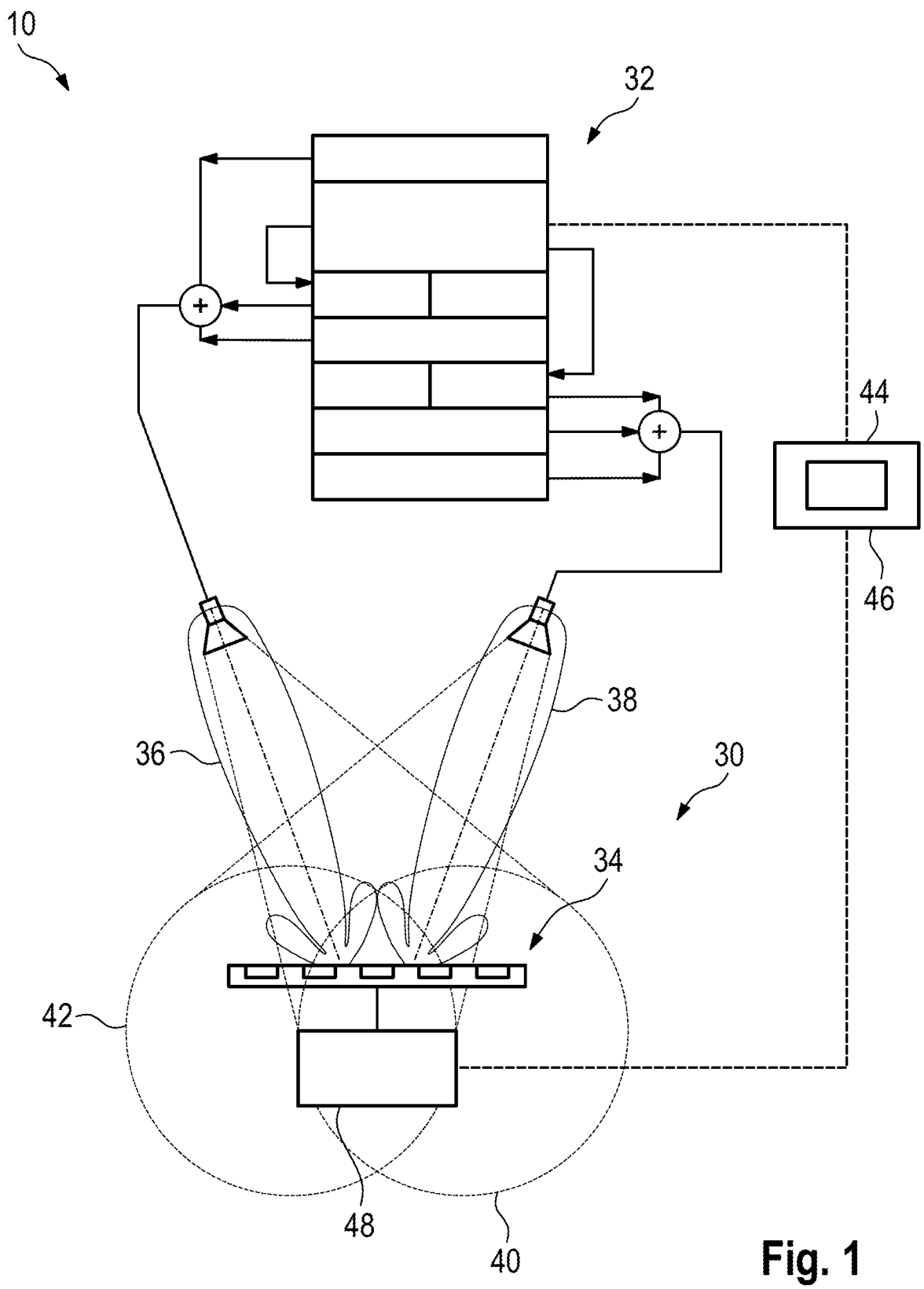
FIG. 1 shows a schematic overview of a testing system according to the invention.
Figure 2:
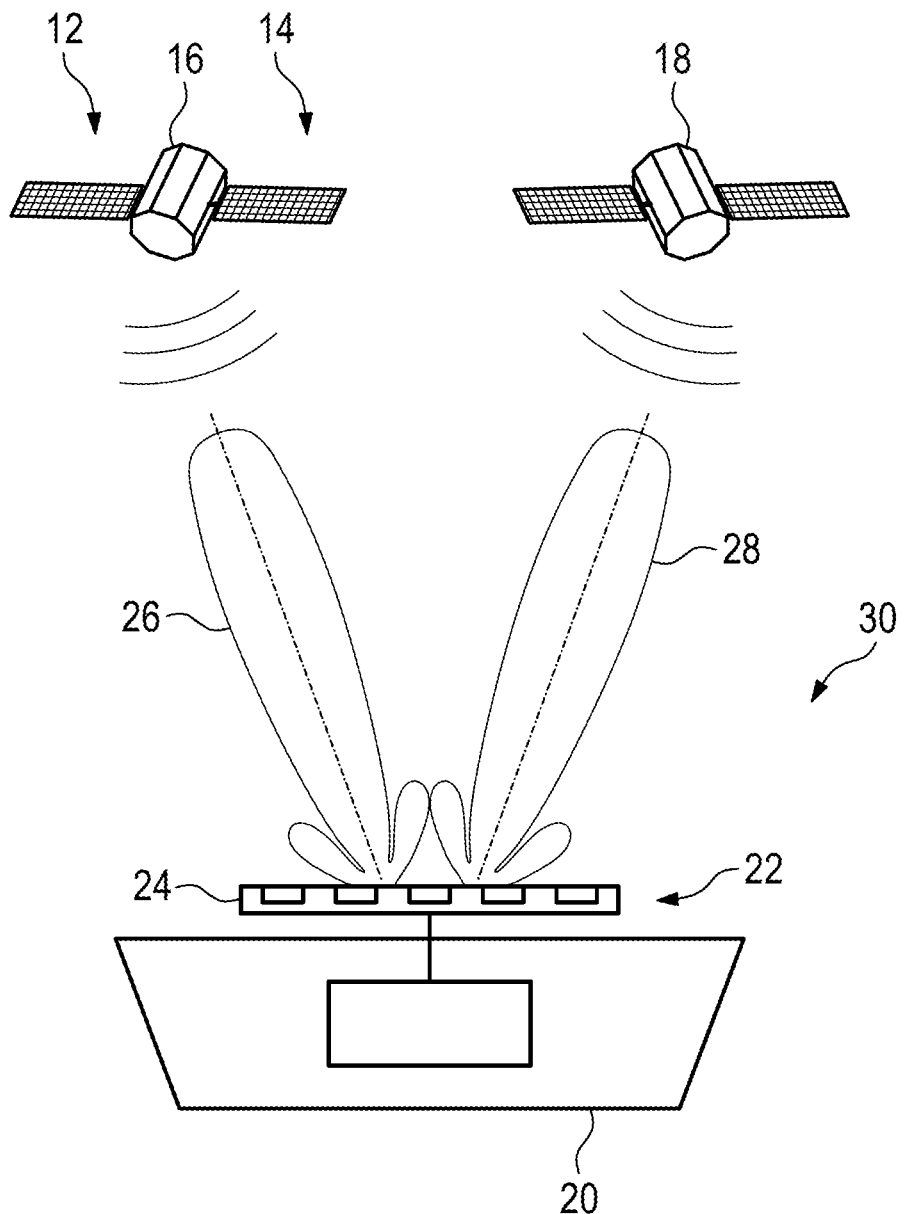
FIG. 2 shows a schematic overview of an environment emulated by using the testing system according to the invention.

In FIG. 1, a testing system 10 for testing a communication between a mobile device and a satellite system. Thus, the testing system 10 emulates an environment that is schematically illustrated in FIG. 2.

The environment relates to a communication system 12 comprising a satellite system 14 with two satellites 16, 18 and a mobile device 20 communicating with the satellite system 14. In the shown embodiment, the mobile device 20 is a ship that has a communication unit 22 comprising an antenna system 24 for providing at least two beams 26, 28. Both beams 26, 28 correspond to the satellites 16, 18 of the satellite system 14 respectively that have an individual footprint.

While the ship (mobile device 20) is moving, the mobile device 20 communicates via its communication unit 22 with the satellite system 14, in particular the first satellite 16. During the movement, the communication unit 22 controls the different beams 26, 28 such that the first beam 26 maintains the connection with the first satellite 16 while the second beam 28 tracks the other satellite 18 of the satellite system 14. As soon as the mobile device 20 leaves the footprint of the first satellite 16, a handover scenario will be initiated ensuring that the communication with the satellite system 14 is established. In the handover scenario, the communication between the mobile device 20 and the satellite system 14 is transferred from the first satellite 16 to the second satellite 18.

Such a handover scenario is often carried out in reality, e.g. in the environment emulated by the testing system 10 shown in FIG. 1.

The testing system 10 comprises a device under test 30 and a signal generation unit 32 representing the mobile device 20 and the satellite system 12 respectively of the environment shown in FIG. 1.

The signal generation unit 32 is configured to generate testing signals that are transmitted and received by the device under test 30. The testing signals generated by the signal generation unit 32 simulate at least one of a changing satellite signal strength, a changing satellite signal quality, a changing position of said satellite and more than one satellite signal in parallel.

Further, the testing signals generated simulate a changing position of said mobile device 20 in the environment shown in FIG. 2.

However, the device under test 30 representing the mobile device 20 maintains its lateral position during the testing even though a movement of the mobile device 20 is simulated. This movement is only simulated by varying the testing signals generated in an appropriate manner.

The signal generation unit 32 may comprise several different components for generating the testing signals in an appropriate manner, in particular with regard to relative amplitude and phase.

According to a certain embodiment, the testing signals comprise data concerning at least one of global navigation satellite system and carrier identification. These data are also called GNSS data and CID data.

In addition, the testing signals can be generated such that a beamsteering of the satellite signals emitted by the satellites 14, 16 is simulated.

In the testing system 10, the device under test 30 comprises a beamforming unit 34 that provides two different beams 36, 38 representing the beams 26, 28 of the mobile device 20 as shown in the environment in FIG. 2.

These two beams 36, 38 are used for testing the handover scenario of the device under test 30 between the simulated satellites 14, 16 of the satellite system 12. Accordingly, the signal generation unit 32 emulates two simulated footprints 40, 42 of the at least two satellites in order to test the reliability of the handover scenario.

As mentioned above with regard to the environment shown in FIG. 2, the mobile device 20 is handed over between two different satellites 14, 16 of the satellite system 12 in a seamless manner since one beam 26 maintains its connection to one satellite 14 of the satellite system 12 while the other beam 28 tracks another satellite 16 of the satellite system 12.

In relation to this seamless handover scenario used in the real environment, the testing system 10 also simulates the seamless handover scenario while using the different beams 36, 38 provided by the beamforming unit 34 as well as the different footprints 40, 42 established by the signal generation unit 32. For testing purposes, the different beams 36, 38 are varied as well as the different footprints 40, 42 are shifted in order to simulate the movement of the device under test 30 corresponding to the mobile device 20.

In order to verify if the seamless handover scenario has been executed as desired, an indication unit 44 is provided that is connected with at least one of the device under test 30 and the signal generation unit 32. This indication unit 44 is configured to indicate an executed indication.

Moreover, an analyzing unit 46 is provided to analyze the testing. Therefore, the analyzing unit 46 is connected with at least one of the device under test 30 and the signal generation unit 32. For instance, the testing signals received by the device under test 30 are analyzed by using the analyzing unit 46. The analyzing unit 46 may comprise the indication unit 44 such that the testing signals are analyzed and an executed handover is indicated appropriately.

The analyzing unit 46 can be established by a spectrum analyzer or any other suitable measurement instrument. The indication unit 44 may be a display that is used for illustrating purposes, in particular displaying the executed handover.

The signal generation unit 32 and the device under test 30 each may comprise several receiving and transmission antennas in order to verify a bidirectional communication between the device under test 30 and the emulated satellite system 12.

In the shown embodiment, the signal generation unit 32 comprises two transmission antennas whereas the device under test 30 has a receiving antenna system established by the beamforming unit 34 being a beamforming antenna system.

In general, the beamforming unit 34 may also comprise transmission antennas in order to test a bidirectional communication.

As shown in FIG. 1, the device under test 30 is mounted top of a metal support 48 wherein the metal support 48 is configured to simulate a ship movement. As the mobile device 20 simulated by the device under test 30 may be a ship, the swaying movement of the ship can be simulated by the metal support 48 appropriately.

The device under test 30 is fixed during the testing such that the device under test 30 does not change its lateral position during the testing apart of the swaying movement provided by the metal support 48 on the same position.

In general, the testing system 10 is configured to simulate movement of a mobile device 20 such that a seamless handover scenario of a mobile device 20 between satellites 14, 16 of a satellite system 12 can be tested. It is simulated that the mobile device 20 moves with respect to the footprints of the satellites that are also simulated by the signal generation unit 32. The testing signals simulate the satellite signals while the testing signals are generated such that the movement of the mobile device is simulated electrically by varying the testing signals appropriately.

The invention claimed is:

1. A method for testing a communication between a mobile device and a satellite system, the method comprising:
generating testing signals by using a signal generation unit, said testing signals simulating satellite signals of at least one satellite of said satellite system; and
receiving said testing signals by a device under test being used as said mobile device,
wherein said testing signals simulate at least one of a changing satellite signal strength, a changing satellite signal quality and a changing position of said satellite wherein said testing signals further simulate a changing position of said mobile device, wherein said device under test maintains its position during testing while a movement of the mobile device is simulated, the movement of the mobile device being only simulated by adapting the testing signals such that the simulated movement of the mobile device results from changing testing signals said testing signals being generated such that the movement of the mobile device is only simulated electrically by varying the testing signals;
said testing signals simulating at least two different areas covered by two different satellites of said satellite system, and
a satellite handover scenario within said satellite system being simulated between these two different satellites of said satellite system.

2. The method according to claim 1, wherein said device under test comprises a beamforming unit, in particular wherein at least two different beams are generated by said beamforming unit.

3. The method according to claim 1, wherein said testing signals simulate a beamsteering of said satellite signals.

4. The method according to claim 1, wherein said testing signals received by the device under test are analyzed by using an analyzing unit.

5. The method according to claim 1, wherein an executed handover of said device under test between two different satellite signals is indicated by using an indication unit.

6. The method according to claim 1, wherein said testing signals comprise data concerning at least one of global navigation satellite system and carrier identification.

7. A testing system for testing a communication between a mobile device and a satellite system, the testing system comprising:
- a signal generation unit configured to generate testing signals simulating satellite signals of at least one satellite of said satellite system, wherein said testing signals simulate at least one of a changing satellite signal strength, a changing satellite signal quality and a changing position of said satellite; and
- a device under test configured to receive said testing signals, wherein said testing signals further simulate a changing position of said device under test, said device under test being fixed during the testing such that the device under test does not change its lateral position during the testing, wherein a lateral movement of the mobile device is only simulated by the testing signals said testing signals being generated such that the movement of the mobile device is only simulated electrically by varying the testing signals;
- said testing signals simulating at least two different areas covered by two different satellites of said satellite system;
- said testing signals simulating satellite handover scenario within said satellite system being simulated between these two different satellites of said satellite system.

8. The testing system according to claim 7, wherein said device under test comprises a beamforming unit, in particular wherein said beamforming unit is a beamforming antenna system.

9. The testing system according to claim 8, wherein said beamforming unit comprises at least one transmission antenna and at least one receiving antenna.

10. The testing system according to claim 8, wherein said beamforming unit is configured to generate at least two different beams.

11. The testing system according to claim 7, wherein said testing signals simulate a beamsteering of said satellite signals or beamsteering is performed on said device under test, in particular by using said beamforming unit.

12. The testing system according to claim 7, wherein an indication unit is provided that is configured to indicate an executed handover of said device under test between two different satellite signals.

13. The testing system according to claim 7, wherein an analyzing unit is provided that is connected to at least one of said device under test and said signal generation unit.

14. The testing system according to claim 7, wherein said device under test is mounted on top of a metal support, said metal support being configured to simulate a ship movement.

15. The testing system according to claim 7, wherein said testing signals comprise data concerning at least one of global navigation satellite system and carrier identification.

16. A method for testing a communication between a mobile device and a satellite system, including:
- generating testing signals by using a signal generation unit, said testing signals simulating satellite signals of a least one satellite of said satellite system;
- receiving said testing signals by a device under test being used as said mobile device;
- said testing signals simulating of a changing satellite signal strength;
- said testing signals simulating said satellite signals while said testing signals are generated such that the movement of the mobile device is only simulated electrically by varying the testing signals while neither said mobile device nor said signal generation unit or an antenna assigned thereto is physically moved to simulate the movement of said mobile device; a satellite handover scenario within said satellite system being simulated, said satellite handover scenario being seamless, a first testing signal being varied during the testing for simulating the movement of the mobile device with respect to a first satellite, at least a second testing signal being generated in order to simulate the communication between the mobile device and a second satellite of the satellite system.

* * * * *